Dec. 31, 1935. T. HANSEN 2,025,741
METHOD OF ELECTRICALLY WELDING THIN METAL ARTICLES
Filed May 18, 1935
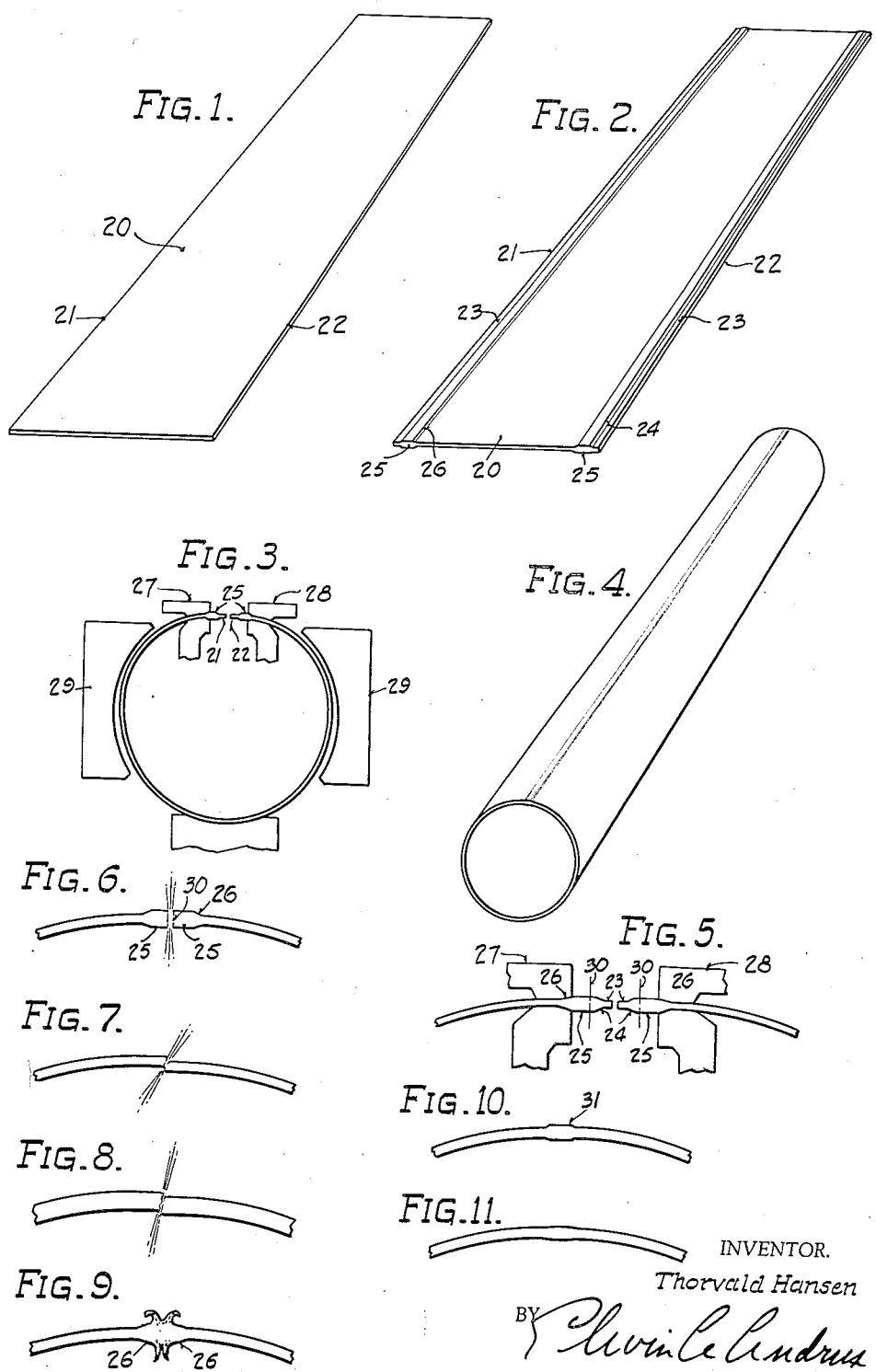

Patented Dec. 31, 1935

2,025,741

UNITED STATES PATENT OFFICE 2,025,741

METHOD OF ELECTRICALLY WELDING THIN METAL ARTICLES

Thorvald Hansen, Wauwatosa, Wis., assignor to A. O. Smith Corporation, Milwaukee, Wis., a corporation of New York Application May 18, 1935, Serial No. 22,230

6 Claims. (Cl. 219—10)

The present invention relates to the electrical welding of thin metal articles and more specifically the electric flash resistance welding of thin metal articles.

The present invention makes possible the successful welding by the electric flash resistance method of long or extended seams in thin sheet metal articles which must attain maximum strength.

This invention has been found especially beneficial in the construction of steel pipe for use in the distribution of gas and oil.

Steel pipes for use in the distribution of gas and oil have been formed into long lengths of from 30 to 40 feet, and their longitudinal seams simultaneously welded by flash resistance welding, as in the patent to Andren et al. No. 1,872,055 and in the Nilson et al. Patent No. 1,872,793. In general, these pipes were of a thickness of ¼ inch or more.

It has become desirable to use a higher strength steel than customarily used before, as for instance to use a .50 carbon steel or higher in the construction of such pipes, and after the completion of the fabrication to heat treat the finished pipe to obtain its maximum strength. This would result in a pipe of much less thickness to meet the same requirements of pressure to which the pipe must be subjected.

Thus, it occurs that in many instances, a pipe of only ⅛ inch thickness is sufficient to meet the specified requirements.

Considerable difficulty has been encountered in welding such thin-walled high strength pipe by the flash resistance process. This invention has overcome these difficulties and provides a method by which consistent and highly satisfactory welds of the above-named nature may be produced.

Since, in the case of the thinner material, the saving in weight of pipe is being obtained by correspondingly increasing the strength of the material of said pipe, it is obvious that the full strength of that thinner material must be developed in the weld itself, or the object of using the thinner material will be defeated. The welds must not only be tight against leak, but must be strong to develop the strength of the pipe material.

In flash welding of thin sheets, such for instance as is done in the welding of automobile bodies, maximum strengths of the class above described are not needed and the sheets can be flashed for a short period to heat the abutting edges to an exceedingly narrow band of plastically hot material and then be pressed together an amount sufficient to close the gaps and make a tight joint capable of being polished and finished in a manner satisfactory for the use intended. In such welding, very little molten or plastic metal is extruded at the time of making the weld by the application of pressure.

In the welding of extended thin metal sheets by the flash resistance method, the present invention makes possible the production of relatively wide bands of plastic metal, and the application of high welding pressures to produce a union of the edges thereof which is far superior to that heretofore obtainable in the welding together of such thin sheets.

Referring to the drawing:

Figure 1 is a perspective view of a thin rectangular metal sheet to be formed into a pipe;

Fig. 2 shows a perspective view of the sheet of Figure 1 after its edges have been treated in accordance with the present invention;

Fig. 3 shows a diagrammatic end view of the sheet of Fig. 2 formed into cylindrical shape and placed in position for flash welding a longitudinal seam;

Fig. 4 is a perspective view showing the general appearance of the pipe after completion;

Fig. 5 is an enlarged end view of the two edges before welding;

Fig. 6 is a view similar to that of Fig. 5, and showing the condition of the edges just prior to the application of the welding pressure;

Fig. 7 is an enlarged end view showing the effect of misalignment upon the edges as a result of the flashing operation;

Fig. 8 is a view similar to Fig. 7 showing the change due to increasing the thickness of the edge parts being flashed;

Fig. 9 shows the normal appearance of the weld at the end of application of welding pressure in following the procedure of the present invention;

Fig. 10 shows the appearance of the weld position after trimming away the extruded metal; and Fig. 11 shows a further weld treatment applied when the pipe is to be vitreous enameled.

In Figure 1, 20 represents a long thin sheet of metal to be formed into a tubular shape and joined by welding along the edges 21 and 22. In the present invention, this joinder is made by the flash resistance welding of said seam simultaneously throughout its entire length.

In the flash resistance welding of long seams in thin sheets, certain impediments exist to the production of the highest quality welds throughout their lengths. Among these impediments is the difficulty that, due to welding machine limitations and imperfections of straightness in the sheet edges, slight misalignments of the edges about to be heated and welded exist. These misalignments have, as will later be explained, pronounced effect upon the condition of the edges at the time of application of pressure to weld these edges.

In the present invention, the edge portions of the sheet are thickened somewhat at positions parallel to and removed from the extreme extremities of such edge portions. A shape of the edge portions suitable for practicing the invention is shown in Fig. 2 in which approximately the original sheet thickness exists at edge portions 23. A gradual incline or approach 24 extends between the extreme edge portion 23 and the intermediate thickened portion 25, and a similar gradual approach 26 also exists between the thickened portion 25 and the main thin sheet 20. It is preferred to thicken the edges, as described, by the cold rolling application of edgewise rolls of suitable contour with the central portion of the sheet held between supports. In this way it is possible to produce a straight edged blank of accurate dimensions suitable for the purpose and having its material set, thereby retaining said accuracy and straightness. Other methods such as hot forming may result in considerable distortion of the edges due to shrinking or other causes, thereby defeating the attainment of the end sought.

The sheet 20 is next formed into cylindrical shape with edges 21 and 22 in opposed relation, as shown in Fig. 3, and positioned for welding with electrodes 27 and 28 positioned to supply electric current across the seam for heating and welding the same. Pressure means 29 are provided to exert pressure upon the heated seam at the desired time and weld the same. The shoulder 26 of the thickened portion may also serve as an abutment for the electrodes through which additional pressure may be applied. Fig. 5 is an enlarged view of the edges shown at the time of starting the heating with the current carrying electrodes 27 and 28 shown in position upon the sheet. The edge portions are numbered as in Fig. 2.

Those portions 23 are now brought into contact and a flashing arc established throughout their length. These edge portions 21 and 22 are then gradually fed toward each other to maintain the heating arc and supply the material flashed away. This procedure is continued until the edges have been consumed to approximately the position 30. Fig. 6 represents the condition at this point in the procedure.

Preferably, the voltage employed between the edges to maintain the flashing arc is low enough, and the rate of feeding the edges toward each other so gauged as to retain as much heat in the remaining metal as possible as the position 30 is reached. This will preferably produce a plastic condition in the thickened portion 25 extending substantially to the position of the approach 26. The edges are now advanced suddenly toward each other and high pressure applied, the result of which is the welding of the edges and a decided protrusion of the plastic material, thus causing a thickening from approach 26 to approach 26. (See Fig. 9.) In the application of this welding pressure, it is important that, after the generous extrusion of material, the unfused portions of said sheets shall have approached each other sufficiently to support high unit pressure therebetween in order that the molten or semi-molten material still in the line of pressure have high unit pressure exerted thereupon to produce a weld of the highest quality.

The above employment of the thickening of the edges in the regions, as described, contributes to the ability to impose such desirable high unit pressures in the following manner. When the edges to be flash welded are thin, misalignment troubles occur which tend to become more exaggerated as thinner sheets are employed, resulting in the flashing arc eating away the material at a considerable angle to the normal plane of the joint due to the natural tendency for the arc to adjust itself to that contour which offers the least resistance to the expulsion of molten metal. (See Fig. 7.)

Thus, when high welding pressure is applied to the edges, the extremely slippery molten metal on the meeting faces of the edges may cause these edges to slide over each other, especially if any misalignment was present while arcing occurred.

By increasing the thickness of the metal involved near the finish of the flashing period, a decided lessening of the amount of incline of the opposing edge surfaces due to misalignment is accomplished as compared to a thinner sheet under similar conditions of misalignment due to the same inaccuracy of machine and straightness of edges. (See Fig. 8.)

This enables the high pressure to be applied at the time of weld, without necessitating the slippage above referred to, since the angle of incline of the various misaligned points can thus be kept within safe limits.

After the formation of the weld, the excess material may be cut off, leaving the weld usually appearing much as at 31 in Fig. 10.

It is not necessary in the case of welds produced in the above-described manner that thick material be left at position 31, and grinding operations may be employed which substantially remove excess material. These final operations are desirable in the preparation of the pipe for vitreous enameling in which case the removal of all sharp or angular protuberances is desirable.

In the case of relatively high carbon steel pipe, heated and quenched to produce the high physical strengths needed to enable this thin pipe to take the place in service of much heavier pipe, the metal in the welding zone is also strengthened.

The above-described procedure, however, gives a welded region of highest unit strength, and the strength thereof is thenceforth as good as the parent metal and not dependent upon greater thickness to make the pipe capable of developing in service the full benefit of its strong plate material.

Thus no fear need exist in grinding the material at the joint down to substantially that of the sheet, as shown in Fig. 11, or as illustrated in Fig. 4 which represents a finished pipe or tubular article produced by the above method.

Other structures than pipe or tubes may be constructed by the use of the above-described welding method and the illustrations given are not to be considered in a limiting sense.

As an example, sheets of ⅛ inch in thickness can conveniently have an approach at 24 of $\frac{1}{16}$ inch width, a thickened central portion 25 of ¼ inch width, and a final approach strip 26 of $\frac{3}{16}$ inch width upon or adjacent to which the welding electrodes may bear.

It is advantageous to start the flashing arc on edges of substantially the original stock thickness.

I claim:

1. The process of preparing and uniting extended edges of thin metallic sheets to obtain high unit strength therebetween which comprises preparing said edges to be united by thickening a portion somewhat removed from, but parallel to the extreme edges of said portions to be joined, placing said edges in abutting juxtaposed relation, establishing a flashing arc throughout the longitudinal extent of such juxtaposed edges, feeding such edges toward each other to consume the material of such edges until they have been flashed away into the region of said thickened portion and a substantial amount of said remaining thickened portion made plastic, applying pressure between said edges to weld the same and produce a unit strength in said weld of the magnitude of the strength of the material of the sheet stock, and finally reducing the thickness of such joinder to substantially that of the sheet.

2. The method of forming tubes of high strength from thin sheet material comprising selecting a sheet of suitable rectangular shape, thickening edge portions of said sheet to be joined in strips removed from the edge extremities and forming said sheet into tubular shape with the prepared edges in juxtaposition, establishing a flashing arc between the edges throughout their length to consume the material thereof to a point within the thickened portions and heat a substantial amount of the remainder of said thickened portion to a plastic condition, and applying high unit pressure to force the remaining heated edges together and weld the same.

3. The method of forming a tube from a thin metallic sheet material by welding which comprises forming a sheet of the thin metal into rectangular form of suitable dimensions to make the tube, preparing each of the two longitudinal edges for uniting by welding which preparation consists of thickening a portion of said sheet parallel and near to each of said longitudinal edges while retaining the thinness of the sheet at said edges and producing gradual approaches from the thinner to the thicker sections, forming said rectangular sheet into a tube with said edges opposed in position for joining by welding, applying voltage across said edges, establishing a flashing arc therebetween, flashing away those portions of the sheet which begin with the first thinned portions, include the approaches to the thickened portion and extend into said thickened portion to heat the remaining part of said thickened portion to a temperature to render it plastic to substantially the boundary thereof, forcing said heated edges together to weld the same and extrude or thicken the edges to approximately the beginning of the remaining approaches, and trimming away the extruded material.

4. The method of joining extended edges of thin metal sheets which comprises thickening the sheets to be joined in regions parallel and near to but removed from the original edges of said sheets, placing said edges in juxtaposed abutting relation, establishing a flashing arc between such juxtaposed edges, said arc simultaneously existing throughout the extent thereof to remove the metal of such edges to positions within the thickened regions thereof and heat the remaining edges, and pressing the heated edges together to weld the same.

5. The method of joining extended edges of thin metal sheets which comprises thickening by cold rolling the sheets to be joined in regions parallel and near to but removed from the original edges of said sheets, placing said edges in juxtaposed abutting relation, establishing a flashing arc between such juxtaposed edges, said arc simultaneously existing throughout the extent thereof to remove the metal of such edges to positions within the thickened regions thereof and heat the remaining edges, and pressing the heated edges together to weld the same.

6. The method of forming tubes of high strength from thin sheet material comprising selecting a sheet of suitable rectangular shape, thickening edge portions of said sheet to be joined in strips removed from the edge extremities while retaining the thickness of the sheet at said edge extremities, forming said sheet into tubular shape with the prepared edges in juxtaposition, establishing a flashing arc between the edges throughout their length to consume the material thereof to a point within the thickened portions and heat a substantial amount of the remainder of said thickened portion to a plastic condition, and applying high unit pressure to force the remaining heated edges together and weld the same.

THORV. HANSEN.